(12) United States Patent
Jukkola et al.

(10) Patent No.: US 8,307,821 B2
(45) Date of Patent: Nov. 13, 2012

(54) CONTINUOUS MOVING BED SOLAR STEAM GENERATION SYSTEM

(75) Inventors: Glen D. Jukkola, Glastonbury, CT (US); Mark Palkes, Glastonbury, CT (US); Bard C. Teigen, Enfield, CT (US)

(73) Assignee: Alstom Technology Ltd., Baden (CH)

( * ) Notice: Subject to any disclaimer, the term of this patent is extended or adjusted under 35 U.S.C. 154(b) by 516 days.

(21) Appl. No.: 12/421,060

(22) Filed: Apr. 9, 2009

(65) Prior Publication Data

US 2009/0277443 A1    Nov. 12, 2009

Related U.S. Application Data

(60) Provisional application No. 61/059,080, filed on Jun. 5, 2008, provisional application No. 61/045,361, filed on Apr. 16, 2008.

(51) Int. Cl.
*F24J 2/30* (2006.01)
*F24J 2/24* (2006.01)
*F24J 2/26* (2006.01)
*F24J 2/04* (2006.01)

(52) U.S. Cl. ......... 126/643; 126/655; 126/674; 126/678

(58) Field of Classification Search .................. 126/643, 126/655, 674, 678
See application file for complete search history.

(56) References Cited

U.S. PATENT DOCUMENTS

| 2,592,121 | A | * | 4/1952 | Crowley, Jr. ..................... 502/45 |
| 3,908,632 | A | | 9/1975 | Poulsen |
| 4,479,353 | A | * | 10/1984 | Schluderberg .................. 60/659 |
| 4,499,893 | A | | 2/1985 | Hunt et al. |
| 4,513,733 | A | * | 4/1985 | Braun ........................... 126/643 |
| 2007/0107431 | A1 | | 5/2007 | Martin |
| 2009/0261591 | A1 | | 10/2009 | Palkes et al. |
| 2009/0277443 | A1 | | 11/2009 | Jukkola et al. |

FOREIGN PATENT DOCUMENTS

| DE | 3403354 | 8/1985 |
| DE | 102008036210 | 2/2010 |
| EP | 0109288 | 5/1984 |
| EP | 0151045 | 8/1985 |

OTHER PUBLICATIONS

PCT International Search Report and the Written Opinion of the International Searching Authority dated May 25, 2010—(PCT/US2009/040338).

* cited by examiner

*Primary Examiner* — Kenneth Rinehart
*Assistant Examiner* — William Corboy
(74) *Attorney, Agent, or Firm* — Michaud-Kinney Group LLP

(57) ABSTRACT

A continuous moving bed solar steam generation and storage system is provided to generate steam for production processes after loss or reduction of received solar energy. The system includes a receiver 10 that receives a flowing stream of particulate material 30 that absorbs solar radiant energy 15 as it passes through beams of the energy 15 received from collectors 14. The heated stream of material 30 passes into a first chamber 40 to heat a tube bundle 42 therein. Heat from the particulate material 30 is transferred to the bundle 42, evaporating the water to generate, reheat (RH) and/or superheat (SH) steam 46. The cooled material 30 passes to a second chamber 60. The material 30 is drained from the second chamber 60 and carried to a cyclone 80 in the receiver 10. The material 30 drains from the cyclone 80 to complete the flow cycle.

19 Claims, 5 Drawing Sheets

CONTINUOUS MOVING BED SOLAR STEAM GENERATION SYSTEM

CROSS REFERENCE TO RELATED APPLICATIONS

This patent application claims benefit under 35 U.S.C. §119(e) of U.S. Provisional Patent Application Ser. No. 61/059,080, filed Jun. 5, 2008, and U.S. Provisional Patent Application Ser. No. 61/045,361, filed Apr. 16, 2008, the contents of which are incorporated by reference herein in their entireties.

TECHNICAL FIELD

The present disclosure relates generally to a solar steam generator, and more particularly, to a solar steam generator having a continuous moving bed (CMB) of energy absorbing material.

BACKGROUND OF THE INVENTION

Generally speaking, a solar generator includes a solar receiver for heating a heat transfer fluid by concentrating solar radiant energy collected by a plurality of mirrors and/or heliostats on the receiver. During periods when the sun provides little radiant solar energy (e.g., at night or on relatively cloudy days), the temperature of the heat transfer fluid decreases or cools down, resulting in energy loss and a need for increased recovery time to re-heat the heat transfer fluid once sufficient solar radiant energy is again provided to the solar receiver.

Accordingly, the inventors have discovered that by providing a heat supply system having a continuous moving bed (CMB) of energy absorbing material, problems associated with the cooling of the heat transfer fluid during the periods of lesser radiant energy can be overcome.

SUMMARY OF THE INVENTION

According to aspects disclosed herein, there is provided a solar generation and storage system. The system includes a solar receiver having an inlet and an outlet such that a stream of particulate material flows therethrough and absorbs heat of solar radiant energy provided to the solar receiver. A first chamber having an inlet is coupled to the receiver. The first chamber receives the heated stream of particulate material from the solar receiver. A first tube is disposed in the first chamber. The first tube includes a heat transfer fluid passing therethrough. In one embodiment, in the first chamber the heated stream of particulate material flows past the first tube transferring heat to the heat transfer fluid and cooling the heated stream of particulate material. The system also includes a second chamber that receives the cooled stream of particulate material, and a transport conduit that carries the cooled stream of particulate material to the inlet of the solar receiver.

In one embodiment, the heat transfer fluid includes at least one of water and steam. When heated, the heat transfer fluid includes at least one of steam, reheated steam and superheated steam. In one embodiment, the first tube includes a plurality of tubes. A second tube of the plurality of tubes includes water and generated steam. At least a third tube of the plurality of tubes includes steam, reheated steam and superheated steam.

In one embodiment, the solar generation and storage system further includes at least one first particulate control valve that controls the flow of the particulate material from the first chamber to the second chamber. The solar generation and storage system may also include a particulate separator included in the solar receiver that receives the particulate material from the second chamber. In one embodiment, the system further includes at least a second particulate control valve that controls the flow of the particulate material from the second chamber to the solar receiver, and in one embodiment the second particulate control valve controls the flow to the separator.

The above described and other features are illustrated by the following figures and detailed description.

BRIEF DESCRIPTION OF THE DRAWINGS

Referring now to the Figures, which are exemplary embodiments, and wherein the like elements are numbered alike.

DETAILED DESCRIPTION OF PREFERRED EMBODIMENTS

Figure 1:
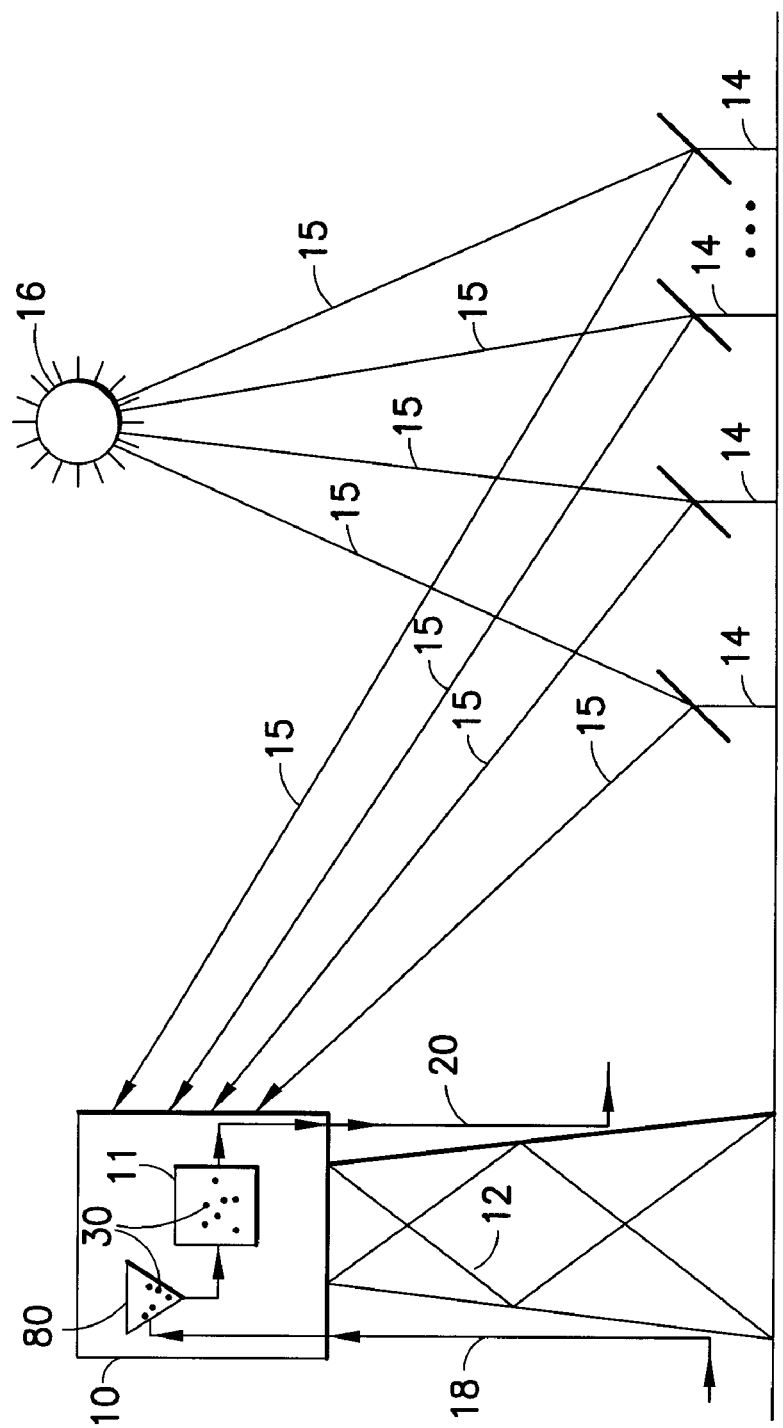
FIG. 1 is a schematic diagram of a solar receiver portion of a steam generation and storage system, in accordance with one embodiment.

As shown in FIG. 1, in accordance with one embodiment, a solar receiver 10 is disposed on a tower 12 in proximity to a plurality of solar collectors 14 such as, for example, mirrors or heliostats. An exemplary solar generator including the solar receiver 10 is described in the above identified commonly assigned, co-pending U.S. Provisional Patent Application Ser. No. 61/045,361.

The solar collectors 14 direct solar radiant energy 15 from the sun 16 to the solar receiver 10. In one embodiment, the collectors 14 have a curved or flat configuration, and are independently adjustable in response to the relative position of the sun 16. For example, one or more of the collectors 14 are controlled by one or more control devices (not shown) to detect and track the relative position of the sun 16 as it moves during a period of time. As such, the collectors 14 periodically adjust according to a current position of the sun 16 to reflect the solar radiant energy 15 (e.g., sunlight) onto the receiver 10, thereby heating the receiver 10 and a heat transfer medium 30 provided to the receiver 10 through an inlet conduit 18 and carried from the receiver 10 through an outlet conduit 20.

Figure 2:
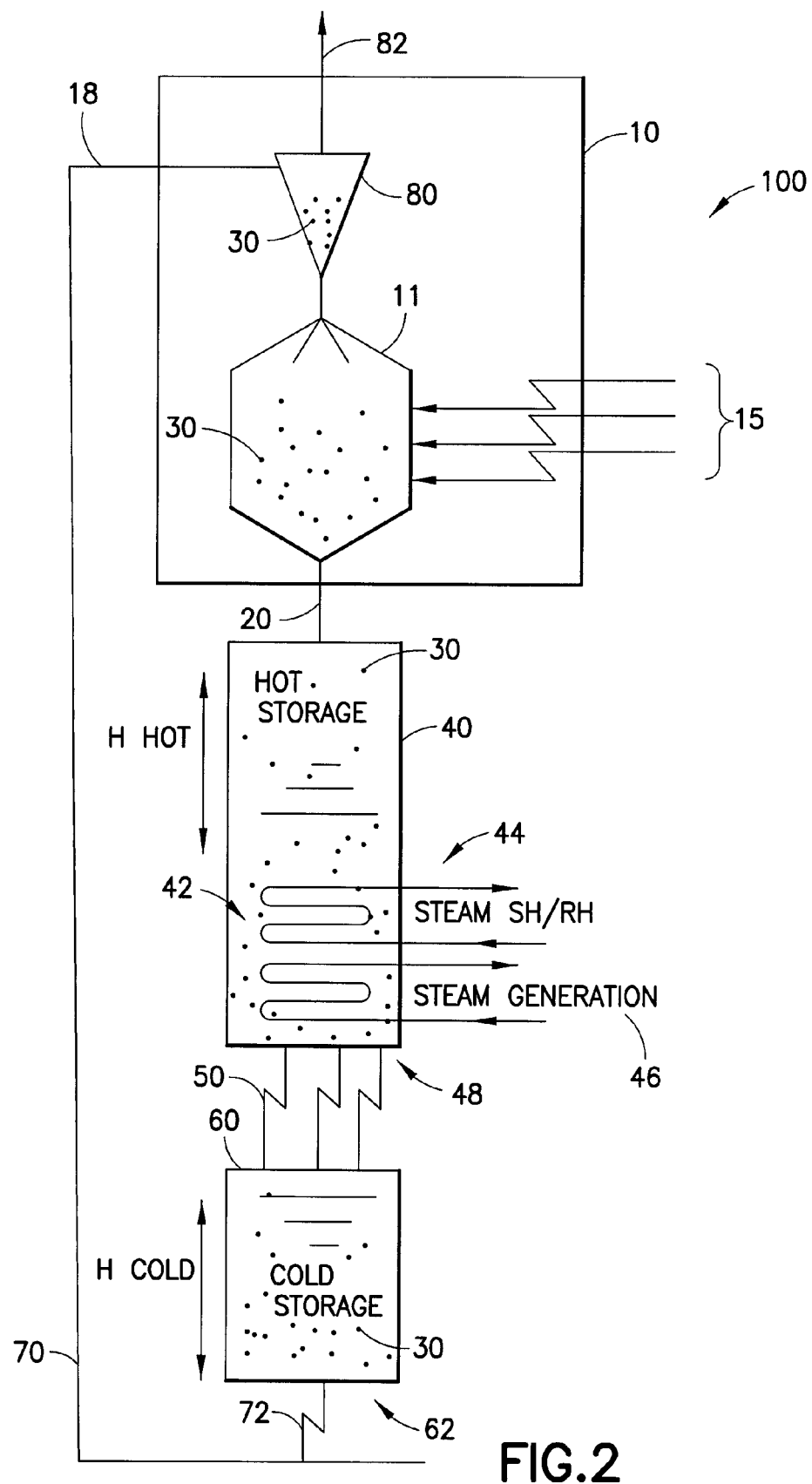
FIG. 2 is a schematic diagram of a continuous motion bed (CMB) arrangement of the solar receiver of FIG. 1, included within a steam generation and storage system in accordance with one embodiment.

FIG. 2 illustrates the receiver 10 of FIG. 1 employed within a continuous moving bed (CMB) solar steam generation and storage system 100 for the production of steam during both periods of receipt of increased solar radiant energy (e.g., daylight) and periods of receipt of decreased solar radiant energy (e.g., at night or on cloudy days). As described herein, the system 100 generates and stores thermal energy for process purposes. As shown in FIG. 2, the receiver 10 contains a flowing stream of particulate material 30 that absorbs solar radiation 15 as particles within the flowing stream 30 pass through a portion 11 of the receiver 10 and through concentrated beams of solar radiation 15 provided by the solar collector field 14. In one embodiment, the particles of the stream of particulate material 30 are comprised of granular particulate having a particle size that is selected to maximize heat storage, while minimizing a temperature difference between surface and average internal regions of the particles. Other factors of interest in selecting the particle size include, for example, aerodynamic considerations to prevent particle loss due to wind currents at the receiver interface, particle thermal transport properties and density, and economic considerations such as, for example, material cost and availability. As can be appreciated, all of these considerations are optimized in selecting preferred particle sizes.

The stream of particulate material 30 is passed from the receiver 10 at a temperature in a range of, for example, about one thousand five hundred to about two thousand degrees Fahrenheit (1500° F. to 2000° F., about 816° C. to about 1093° C.) into a first chamber 40 such as, for example, a hot storage chamber 40 coupled to the receiver 10. The first chamber 40 includes a steam generating tube bundle 42 located in a portion of the first chamber 40. The tube bundle 42 includes a heat transfer fluid. In one embodiment, the steam generating tube bundle 42 is located in a lower portion 44 of the first chamber 40. In various embodiments, the steam generating tube bundle 42 generates, regenerates and superheats steam 46 from the heat transfer fluid and the steam 46 is directed to one or more steam turbine-generators 202 (FIG. 3), a petrochemical cracking tower 302 (FIG. 4), or as process steam for use in other commercial and/or industrial processes.

As shown in FIG. 2, the hot particulate material 30 flows into the first chamber 40, circulates and flows past the steam generating tube bundle 42 by, for example, gravity flow and/or mechanically assisted flow (e.g., is pumped into and about the chamber 40), such that steam is generated, regenerated and/or super heated from the heat transfer fluid and/or steam in the tube bundle 42. As the particulate material 30 flows past the tube bundle 42 heat from the particulate material 30 is transferred to the tube bundle 42 to generate, regenerate and/or super heat steam circulating in the tube bundle 42. For example, in one embodiment, water and/or a mix of water and water vapor flows within the tube bundle 42 that evaporates to generate steam 46, and/or process steam 46 is further heated in the tube bundle 42 to provide superheated (SH) or reheated (RH) steam 46 in the tube bundle 42. As can be appreciated, the heat transfer from the particulate material 30 to the tube bundle 42 and the water, vapor and steam 46 therein results in a cooling of the particulate material 30. In one embodiment, the tube bundle 42 includes a plurality of tubes, one or more of the plurality of tubes having extended surfaces such as, for example, fins, ribs, and the like, to increase a rate at which heat transfers to the tube bundle 42. The fins may also reduce weight and/or cost of manufacture and maintenance of the tube bundle 42 and portions thereof. It should be appreciated that by holding a supply of heated particulate material 30 in the first chamber 40 and permitting it to circulate about and/or flow past the tube bundle 42 steam may be generated and/or regenerated (e.g., superheated and/or reheated) during periods of time when the receiver 10 is receiving a decreased amount or intensity of solar radiant energy 15 (e.g., at night or on cloudy days).

In one embodiment, a flow rate of the stream of particulate material 30 out of the first chamber 40 is controlled by one or more flow control valves 50 coupled to an output 48 of the first chamber 40 and, for example, downstream of the flow about the steam generating tube bundle 42. As shown in FIG. 2, the cooled particulate material 30 passes through the flow control valves 50 to a second chamber 60 such as, for example, a cold storage chamber 60. In one embodiment, the control valves 50 cooperate to control the amount of particulate material 30 passing through, circulating about and/or flowing past the tube bundle 42 and, thus, control the amount, temperature, pressure and/or intensity of steam generated by the CMB solar steam generation and storage system 100. For example, the inventors have found it advantageous to control the flow of particulate material 30 from the first chamber 40 during the periods of increased receipt of solar radiant energy (e.g., during daylight periods) so that the first chamber 40 slowly fills with hot particulate material 30 during such increased receipt periods for current and subsequent use. Similarly, the inventors have found it advantageous to control the flow of particulate material 30 from the first chamber 40 during the periods of decreased receipt of solar radiant energy (e.g., during night time or cloudy day periods) so that the first chamber 40 maintains within and continues to permit circulation and flow of the hot particulate material 30 past the tube bundle 42 during such decreased receipt periods such that steam continues to be generated, regenerated and/or super heated during such periods. It should be appreciated that particle flow rates and size of the chambers 40 and 60 are selected to permit continuous operation at full load over, for example, a twenty-four (24) hour time period.

In one embodiment the cooled particulate material 30 is passed from the first chamber 40 at a temperature in a range of about three hundred to about five hundred degrees Fahrenheit (300° F. to 500° F., about 149° C. to about 260° C.) into the second chamber 60 coupled to the control valves 50. In one embodiment, to maintain a predetermined continuous flow in the CMB solar steam generation and storage system 100, the particulate material 30 is removed or drained from the second chamber 60 into a transport conduit 70 such as, for example, a pneumatic transport conduit 70, through one or more particulate control valves 72 at an output 62 of the second chamber 60. The transport conduit 70 carries the particulate material 30 to the inlet conduit 18 of the receiver 10. In one embodiment, a cyclone 80 is coupled to the inlet conduit 18 in, for example, the receiver 10 to remove, for example, air or gas 82 used within the transport conduit 70 to drive the particulate material 30 back to the receiver 10. The particulate material 30 accumulates and drains from the cyclone 80 into the portion 11 of the receiver 10 to expose the particulate material 30 to the concentrated beams 15 from the solar field 14 and to complete the flow cycle of particulate material 30 through the CMB solar steam generation and storage system 100.

It should be appreciated that the size and/or storage capacity of one or more of the receiver 10, the first chamber 40, the second chamber 60 and the steam generator tube bundle 42 are selected to optimize steam generation during one or more of periods of increased receipt of solar radiant energy (e.g., during periods of sunlight) and decreased receipt of solar radiant energy (e.g., during cloudy day or night time periods).

Figure 3A:
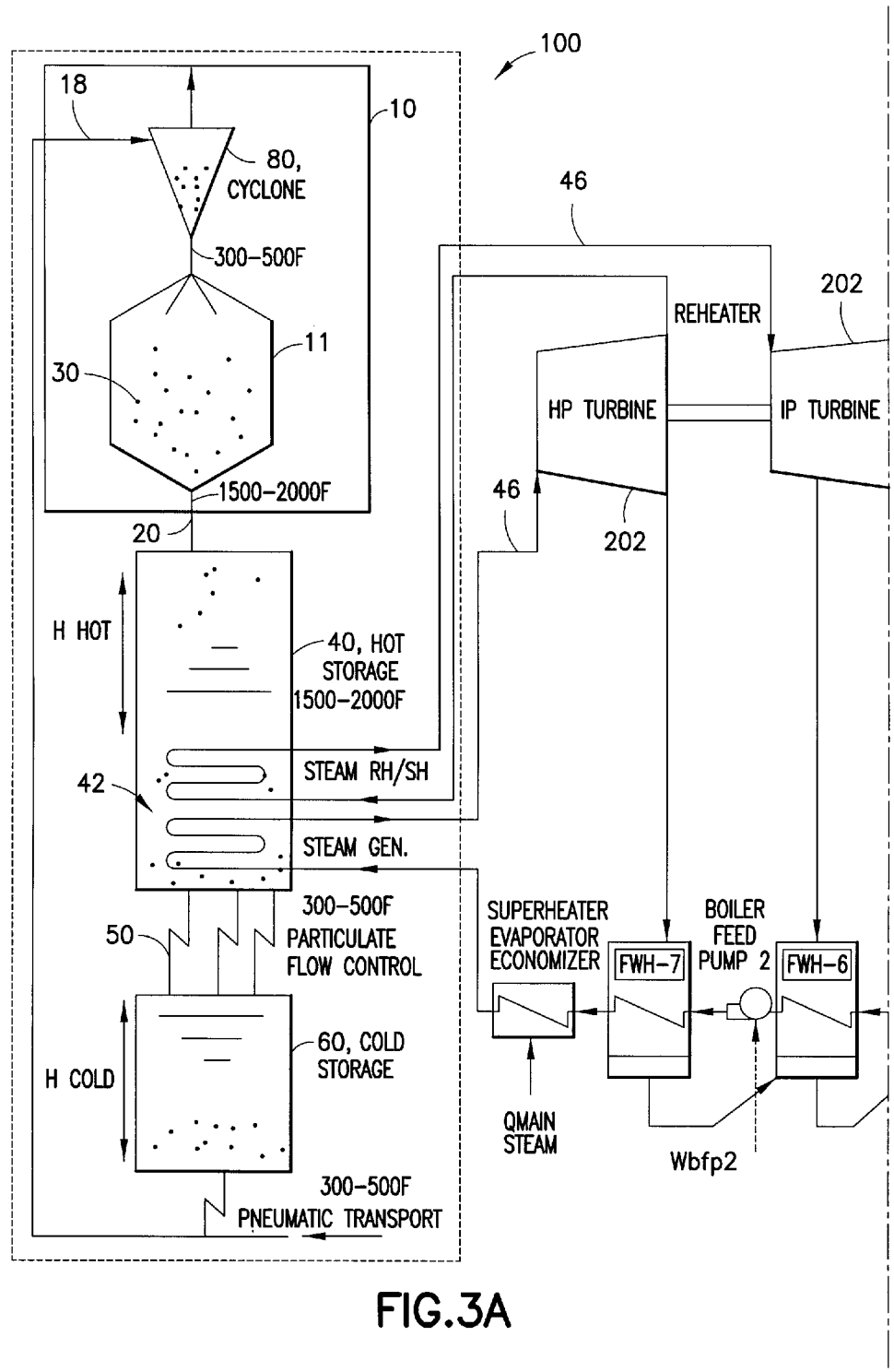
FIG. 3 is schematic diagram of the CMB solar receiver steam generation and storage system of FIG. 2 incorporated into a steam turbine-generator system in accordance with one embodiment.
Figure 3B:
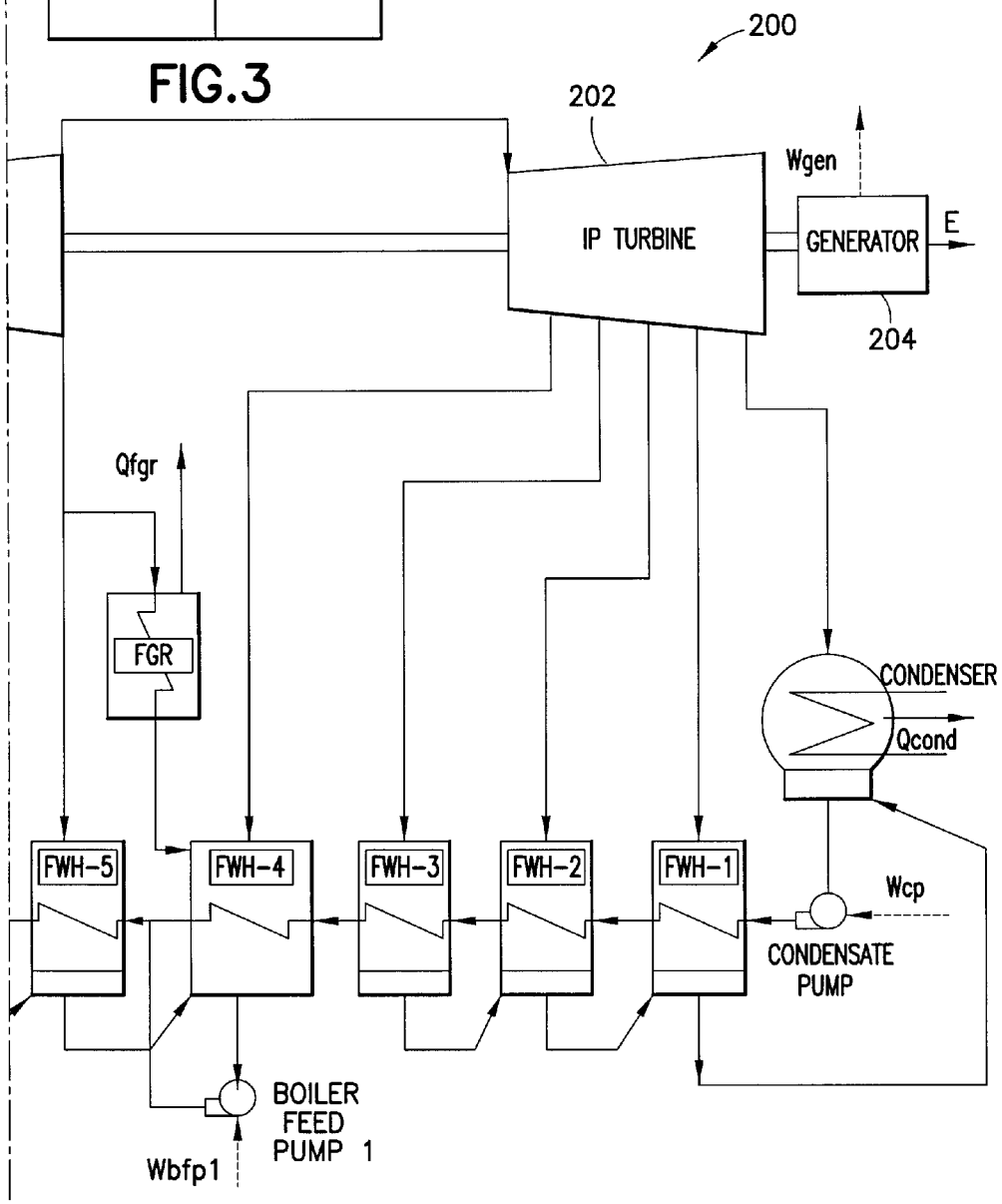
Figure 4:
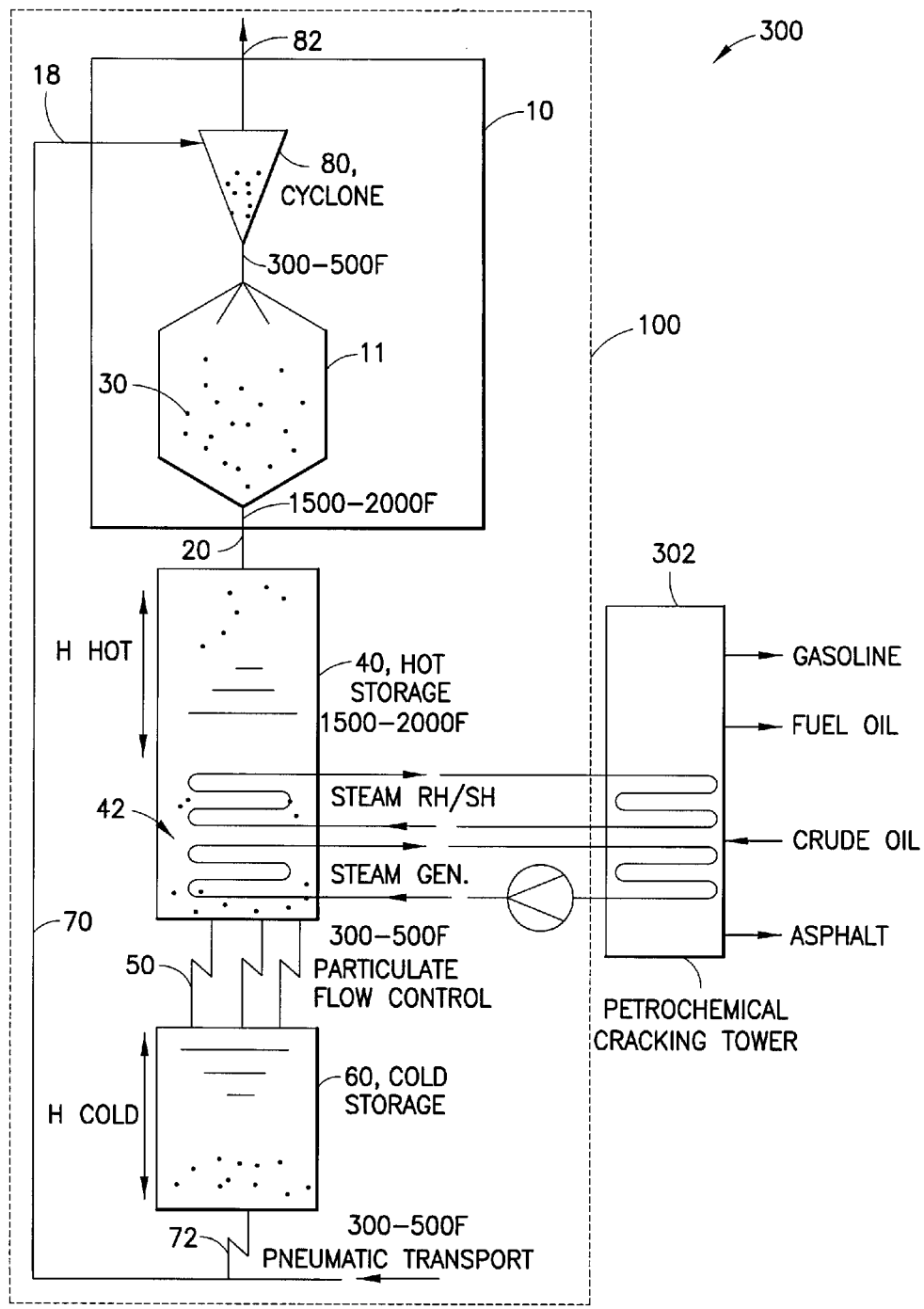
FIG. 4 is a schematic diagram of the CMB solar receiver steam generation and storage system of FIG. 2 incorporated into a chemical process system, in accordance with yet another embodiment.

As is generally known, steam is useful in a variety of commercial and industrial applications. Accordingly, the CMB solar steam generation and storage system 100 of FIG. 2 may be employed to generate steam used to drive, for example, one or more turbines to generate electricity in a cost efficient, environmental friendly manner, as well as in chemical processes. For example, FIG. 3 illustrates the integration of the CMB solar steam generation and storage system 100 into a steam-electric power generation system 200 having one or more turbines 202. As shown in FIG. 3, the steam 46 generated in the steam generating tube bundle 42 is directed to the one or more steam turbines 202 to drive the turbines and a generator 204 coupled thereto to generate electricity E. Additionally, as shown in FIG. 4, the CMB solar steam generation and storage system 100 is integrated into a chemical processing system 300 such as, for example, to provide steam to a petrochemical cracking tower 302 where the high temperature steam is used to break relatively large hydrocarbons (e.g., heavy crude oil) into smaller hydrocarbons (e.g., gasoline, kerosene, etc.) and other chemicals and materials. In other embodiments, the CMB solar steam generation and storage system 100 provides the steam 46 to a steam reforming process such as, for example, a steam methane reforming (SMR) process for producing hydrogen ($H_2$).

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solar steam generation and storage system, comprising:
   a solar receiver having an inlet and an outlet and having particulate material disposed in the solar receiver, the solar receiver being operable to pass a flowing stream of the particulate material through concentrated beams of solar radiation and the particulate material being operable to absorb heat from the concentrated beams of solar radiation;
   a first chamber having an inlet coupled to the outlet of the solar receiver and the inlet of the first chamber being operable to receive the heated stream of particulate material from the solar receiver;
   a first tube disposed in the first chamber, the first tube having a heat transfer fluid passing therethrough, wherein in the first chamber the heated stream of particulate material flows past the first tube transferring heat to the heat transfer fluid and cooling the heated stream of particulate material;
   a second chamber that receives the cooled stream of particulate material;
   a transport conduit for carrying the cooled stream of particulate material to the inlet of the solar receiver; and
   at least one first particulate control valve that controls the flow of the particulate material from the first chamber to the second chamber.

2. The solar steam generation and storage system of claim 1, wherein the heat transfer fluid is comprised of at least one of water and steam, and when heated at least one of steam, reheated steam and superheated steam.

3. The solar steam generation and storage system of claim 2, wherein the first tube includes a plurality of tubes, at least a second tube including water and generated steam, and at least a third tube including steam, reheated steam and superheated steam.

4. The solar steam generation and storage system of claim 1, wherein the first tube includes a plurality of tubes, the plurality of tubes including at least one tube having extended surfaces to increase a rate at which heat transfers to the first tube.

5. The solar steam generation and storage system of claim 1, wherein the solar radiant energy provided to the solar receiver is from a solar collector field having a plurality of minors and/or heliostats.

6. The solar steam generation and storage system of claim 1, wherein during periods of receipt of increased solar radiant energy the at least one first particulate control valve controls the flow such that the first chamber fills with the heated stream of particulate material.

7. The solar steam generation and storage system of claim 1, wherein during periods of receipt of decreased solar radiant energy the at least one first particulate control valve controls the flow such that the first chamber maintains and permits a continued flow of the heated stream of particulate material past the first tube transferring heat thereto.

8. The solar steam generation and storage system of claim 1, wherein the at least one first particulate control valve controls the flow of the particulate material from the first chamber to the second chamber to control at least one of an amount, a temperature, a pressure and an intensity of steam generated, regenerated and reheated within the first tube.

9. The solar steam generation and storage system of claim 1, further including a particulate separator disposed in the solar receiver that receives the particulate material from the second storage chamber.

10. The solar steam generation and storage system of claim 1, further including at least a second particulate control valve that controls the flow of the particulate material from the second storage chamber to the solar receiver.

11. The solar steam generation and storage system of claim 1, wherein when the heat transfer fluid is heated and includes at least steam, the system further includes a conduit for providing the steam as process steam to at least one of a steam turbine-generator, a petro-chemical cracking tower, and a steam reforming process.

12. The solar steam generation and storage system of claim 1, wherein the particulate material is comprised of granular particulate having a particle size that is selected to maximize heat storage, minimizing a temperature difference between a surface region and an average internal region of the particles.

13. The solar steam generation and storage system of claim 12, wherein the particle size is further selected based upon at least one of aerodynamic considerations to prevent particle loss due to wind at the solar receiver, particle thermal transport properties and density, and economic considerations including material cost and availability.

14. A solar steam generation and storage system, comprising:
   a solar receiver having an inlet and an outlet and having particulate material disposed in the solar receiver, the solar receiver being operable to pass a flowing stream of the particulate material through concentrated beams of solar radiation and the particulate material being operable to absorb heat from the concentrated beams of solar radiation;
   a first chamber having an inlet a first chamber having an inlet coupled to the outlet of the solar receiver and the inlet of the first chamber being operable to receive the heated stream of particulate material from the solar receiver;
   a first tube disposed in the first chamber, the first tube having a heat transfer medium passing therethrough, wherein in the first chamber the heated stream of particulate material flows past the first tube transferring heat to the heat transfer medium and cooling the heated stream of particulate material;

a second chamber that receives the cooled stream of particulate material; and a particulate control valve coupled between the first chamber and the second chamber that controls the flow of the particulate material from the first chamber to the second chamber; and a transport conduit for carrying the cooled stream of particulate material to the inlet of the solar receiver;

wherein the particulate control valve controls the flow of the particulate material to fill the first chamber with the heated stream of particulate material and to continue heating the first tube during periods of receipt of decreased solar radiant energy at the solar receiver.

15. The solar steam generation and storage system of claim 14, wherein the heat transfer medium is comprised of at least one of water and steam, and when heated at least one of steam, reheated steam and superheated steam.

16. The solar steam generation and storage system of claim 14, wherein the particulate material is comprised of granular particulate having a particle size that is selected to maximize heat storage, minimizing a temperature difference between a surface region and an average internal region of the particles.

17. The solar steam generation and storage system of claim 16, wherein the particle size is further selected based upon at least one of aerodynamic considerations to prevent particle loss due to wind at the solar receiver, particle thermal transport properties and density, and economic considerations including material cost and availability.

18. The solar steam generation and storage system of claim 14, wherein the particulate control valve fills the first chamber with the heated stream of particulate material during periods of receipt of increased solar radiant energy.

19. The solar steam generation and storage system of claim 14, wherein the particulate control valve controls the flow of the particulate material from the first chamber to the second chamber to control at least one of an amount, a temperature, a pressure and an intensity of steam generated, regenerated and reheated within the first tube.

* * * * *